United States Patent
Sood (10) Patent No.: US 8,767,758 B2
(45) Date of Patent: Jul. 1, 2014

(54) APPARATUS, SYSTEM AND METHOD OF PRIORITIZING A MANAGEMENT FRAME OF A WIRELESS NETWORK

(75) Inventor: Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 276 days.

(21) Appl. No.: 12/611,480

(22) Filed: Nov. 3, 2009

(65) Prior Publication Data

US 2011/0103232 A1 May 5, 2011

(51) Int. Cl.
*H04L 12/28* (2006.01)

(52) U.S. Cl.
USPC ........ 370/412; 370/452; 370/230.1; 370/445; 370/458

(58) Field of Classification Search
None
See application file for complete search history.

(56) References Cited

U.S. PATENT DOCUMENTS

| | | | |
|---|---|---|---|
| 5,132,966 A * | 7/1992 | Hayano et al. | 370/233 |
| 6,654,346 B1 | 11/2003 | Mahalingaiah et al. | |
| 7,797,468 B2 * | 9/2010 | Shin et al. | 710/40 |
| 2003/0235196 A1* | 12/2003 | Balachandran et al. | 370/392 |
| 2005/0063392 A1* | 3/2005 | Ofuji et al. | 370/395.42 |
| 2005/0195813 A1* | 9/2005 | Ambe et al. | 370/389 |
| 2006/0039381 A1* | 2/2006 | Anschutz et al. | 370/395.21 |
| 2006/0098626 A1* | 5/2006 | Park et al. | 370/352 |
| 2006/0153183 A1* | 7/2006 | Lim et al. | 370/389 |
| 2006/0236365 A1 | 10/2006 | Pham | |
| 2007/0014266 A1* | 1/2007 | Kondo | 370/337 |
| 2007/0081513 A1 | 4/2007 | Torsner | |
| 2007/0165638 A1 | 7/2007 | Hasani et al. | |
| 2008/0117918 A1* | 5/2008 | Kobayashi | 370/400 |
| 2009/0049175 A1* | 2/2009 | Finn | 709/226 |
| 2011/0217985 A1* | 9/2011 | Gorokhov | 455/452.2 |

OTHER PUBLICATIONS

The Institute of Electrical and Electronics Engineers, Inc. IEEE Standard for Information Technology—Telecommunications and information exchange between systems—Local and metropolitan area networks—Specific requirements. "Part 11: Wireless LAN Medium Access Control (MAC) and Physical Layer (PHY) Specifications". Jun. 12, 2007. IEEE Std. 802.11-2007. New York, NY USA.
Search Report and Written Opinion for PCT/US2010/049483 mailed on May 24, 2011.
International Preliminary Report on Patentability for PCT/US2010/049483 Mailed on May 18, 2012.
Office Action for Japanese Patent Application No. 2012-536820, mailed Jul. 9, 2013, 6 pages, including 3 pages of English translation.
Thomson, Allan; "Management Frame Priority SG Input"; IEEE 802.11-09/0967r0; Cisco Systems, Sep. 15, 2009, 15 pages.
Klein, Philippe; "802.11 QoS Overview"; IEEE Plenary Meeting—Nov. 8 Dallas, TX; avb-phkl-802-11-qos-overview-0811-1; 39 pages.
Lambert, Paul A.; "Alternate Text for TGi 8.3.4"; IEEE 802.11-03/118r0; IEEE P802.11 Wireless LANs, Jan. 2003; 9 pages.

(Continued)

*Primary Examiner* — Kibrom T Hailu
*Assistant Examiner* — Zewdu A Beyen
(74) *Attorney, Agent, or Firm* — Shichrur & Co.

(57) ABSTRACT

A method and apparatus to enable configuring of a management frame priority and security type. The method and the apparatus may set a priority level and a transmission data rate of a management frame. The apparatus includes a memory including a priority queue for each management frame and a transmitter to transmit said management frame according to the priority queue of said frame.

24 Claims, 4 Drawing Sheets

(56) References Cited

OTHER PUBLICATIONS

Qi, et al.; "Broadcast and Unicast Management Protection (BUMP)"; BUMP Consortium; IEEE 802.11-05/0894r2; Nov. 14, 2005; 33 pages.

McCann, et al.; "QoS Support in Management Frames"; IEEE 802.11-09/0817r1; Jul. 13, 2009; 8 pages.

Office Action received for Chinese Patent Application No. 201010537758.0, mailed on Apr. 3, 2013, 16 pages of Office Action including 10 pages of English Translation.

Office Action for Chinese Patent Application No. 201010537758.0, mailed on Dec. 9, 2013, 14 pages, including 8 pages of English translation.

* cited by examiner

APPARATUS, SYSTEM AND METHOD OF PRIORITIZING A MANAGEMENT FRAME OF A WIRELESS NETWORK

BACKGROUND OF THE INVENTION

Wireless local area network (WLAN) standards, for the example IEEE 802.11 standard family, may define transmitting of management frames (such as, for example a beacon) at a highest data frame priority, and may define at the lowest data rates those transmitting criteria are applied to all management frame uniformly. Furthermore, the IEEE 802.11 standard family defines a plethora of management frames (e.g. IEEE 802.11k Radio Resource Measurements and IEEE 802.11v Wireless Network Management) which may negatively impact WLAN enterprise traffic characteristics. Traffic analysis indicates that in current infrastructure of some WLANs, over 25% of bandwidth is consumed by management frame traffic, which reduces the overall WLAN throughput. This is especially applicable for voice applications over the wireless medium where excessive management frame traffic may decrease available admission capacity of the WLAN.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals. These algorithmic descriptions and representations may be the techniques used by those skilled in the signal processing arts or/and in wireless communication arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer and/or computing system and/or medium access controller (MAC) and/or communication processor, or similar electronic computing device, that manipulate and/or transform data represented as physical, such as electronic, quantities within the computing system's registers and/or memories into other data similarly represented as physical quantities within the computing system's memories, registers or other such information storage, transmission or the like. In addition, the term "plurality" may be used throughout the specification to describe two or more components, devices, elements, parameters and the like. For example, "plurality of mobile stations" describes two or more mobile stations.

It should be understood that the present invention may be used in a variety of applications. Although the present invention is not limited in this respect, the circuits and techniques disclosed herein may be used in many apparatuses such as communication devices of a radio system. The communication devices intended to be included within the scope of the present invention include, by way of example only, mobile stations, base stations and access points of radio systems such as, for example a WLAN which also may be referred to herein as a WiFi, a wireless metropolitan area network (WMAN) which also may be referred to as a WiMAX, a wireless personal area network (WPAN) such as, for example including Bluetooth™, two-way radio transmitters, digital system transmitters, analog system transmitters, cellular radiotelephone transmitters, digital subscriber lines, LTE cellular systems and the like.

Some embodiments of the invention may be implemented, for example, using a machine-readable medium or article which may store an instruction or a set of instructions that, when if executed by a machine, cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, assembly language, machine code, or the like.

In accordance with embodiments of the invention, a channel may be a physical transfer medium. The physical transfer medium may be used to transfer signals such as, for example, informative data signals, training signals, pilot signals, subcarriers signals, preamble signals and the like, that may be modulated by one or more modulation scheme. Furthermore, the channel may be a combination of the physical transfer medium, components of the transmitter and/or the receiver, for example path loss, noise, interference or the like. It should be understood to the skilled artisan that embodiments of the invention may operate with many types of signals (some mentioned above), and the invention is in no way limited to the above mentioned signals.

Figure 1:
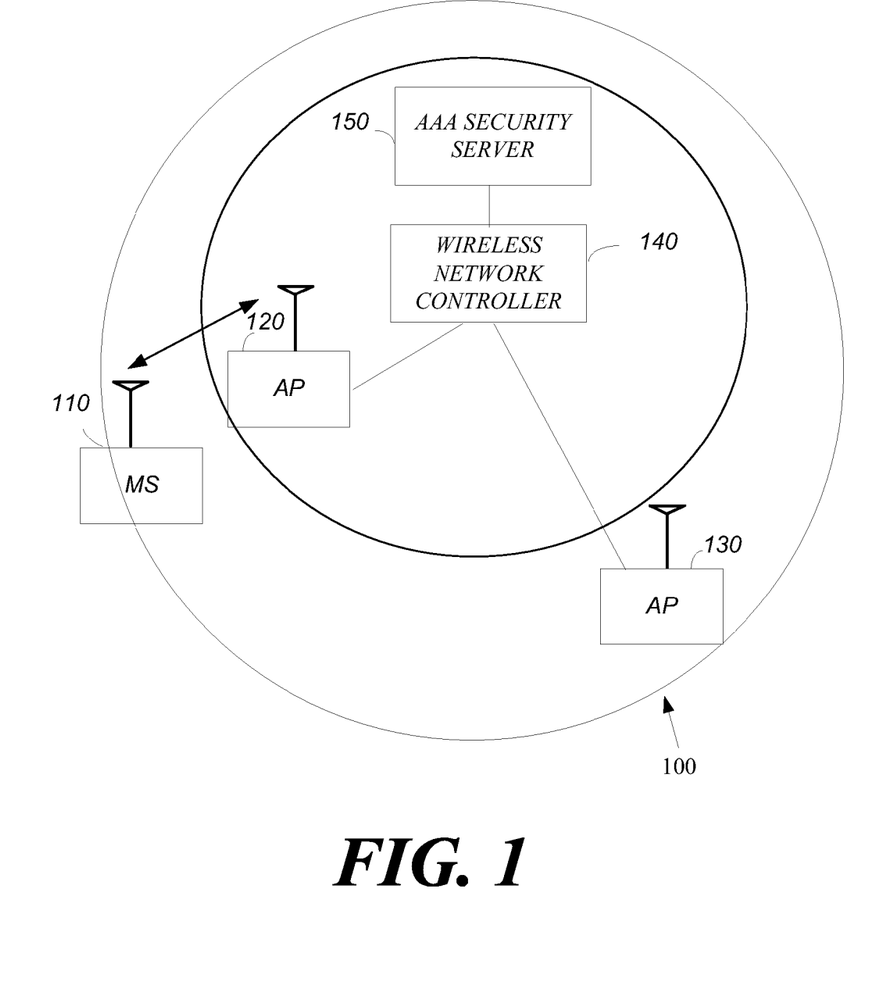
FIG. 1 is an illustration of a portion of a wireless communication network according to an exemplary embodiment of the present invention.

Turning first to FIG. 1, an illustration of a portion of a wireless communication network 100 according to an exemplary embodiment of the present invention is shown. According to this exemplary embodiment of the invention, wireless communication network 100 may include a mobile station (MS) 110, access points (APs) 120 and 130, a wireless network controller 140 and a security server 150 (for example an Authentication, Authorization and Access (AAA) security server, if desired).

Although the scope of the present invention is not limited to this example, wireless communication network 100 may use at least three types of frames for communicating over the network. For example, the first frame type may be a management frame which may be used to establish a WLAN connection between an AP and MSs and may include for example, a probe, an authentication request, an association request, a beacon, or the like. The second frame type may be a control frame that may be used to support transmission of data frame and may include for example, an acknowledgment (ACK) frame, a Request-To-Send (RTS) frame, a Clear-To-Send (CTS) frame, or the like. The third frame type may be a data frame which may be used for transferring data over the network. The data frame may include for example, MAC service data unit (MSDU) or the like, although the scope of the present invention is not limited in this respect.

According to some exemplary embodiments of the invention, when operating for example, in a WLAN compatible with IEEE 802.11-2007 standard, AP 120 may advertise its support for a prioritized management frame for example, in the IEEE 802.11 Extended Capabilities Information Element. Based on this policy, AP 120 may mandate prioritization or not. If prioritization is not mandatory, then legacy IEEE 802.11 stations (non-prioritized management frame clients) may associate with APs 120, 130, if desired. For example, the security parameters "Protect Prioritized Management Frames" which indicates that protection of prioritized management frames is supported and enabled for prioritized management frames is advertised in the RSN IE Capabilities field and in the Extended Capability Information Element.

According to exemplary embodiment of the invention, MS 110 may negotiate a priority level of a management frame with AP 120 and may determine the management frame priority class, for example, Roaming Management Frames class, Emergency Services Management Frame class, Network Management Frames class, Diagnostics Management Class, and Event Reporting Management Frame class, if desired. MS 110 may maintain a separate priority queue for each management frame priority class. MS 110 may assign a data rate and a number of retries based on the priority class. In addition, MS 110 may apply a security processing and appropriate replay protection (for example RTS/CTS protection) for transmitted frames and MS 110 may check for per-priority replay protection on received prioritized management frames, if desired.

According to exemplary embodiments of the invention, AP 120 may maintain a different transmit management traffic queue for each management frame. AP 120 may apply security processing (e.g., Advanced Encryption Standard (AES)) and replay protection (e.g. packet number counters, RTS/CTS protection), if desired. In addition AP 120 may assign data rates and the number of retries based on the priority of the management frame and may replay the check for per-priority receiving of prioritized management frames, if desired.

According to some exemplary embodiments of the invention, wireless network controller 140 may negotiate prioritized management frames with MS 110, may maintain substantially the same prioritized management frames for APs 120 and 130 and may tag one or more management traffic queues of each management frame priority class before sending and or transmitting to AP 120 and/or AP 130, if desired.

Stations of embodiments of the invention may negotiate separately the use of prioritized management frames in wireless communication network 100, and may optionally negotiate the security for those prioritized management frames, if desired.

In an alternate embodiment, wireless network controller 140 may advertise the policy that requires only stations adapted to operate with prioritized management frames to be admitted.

Figure 2:
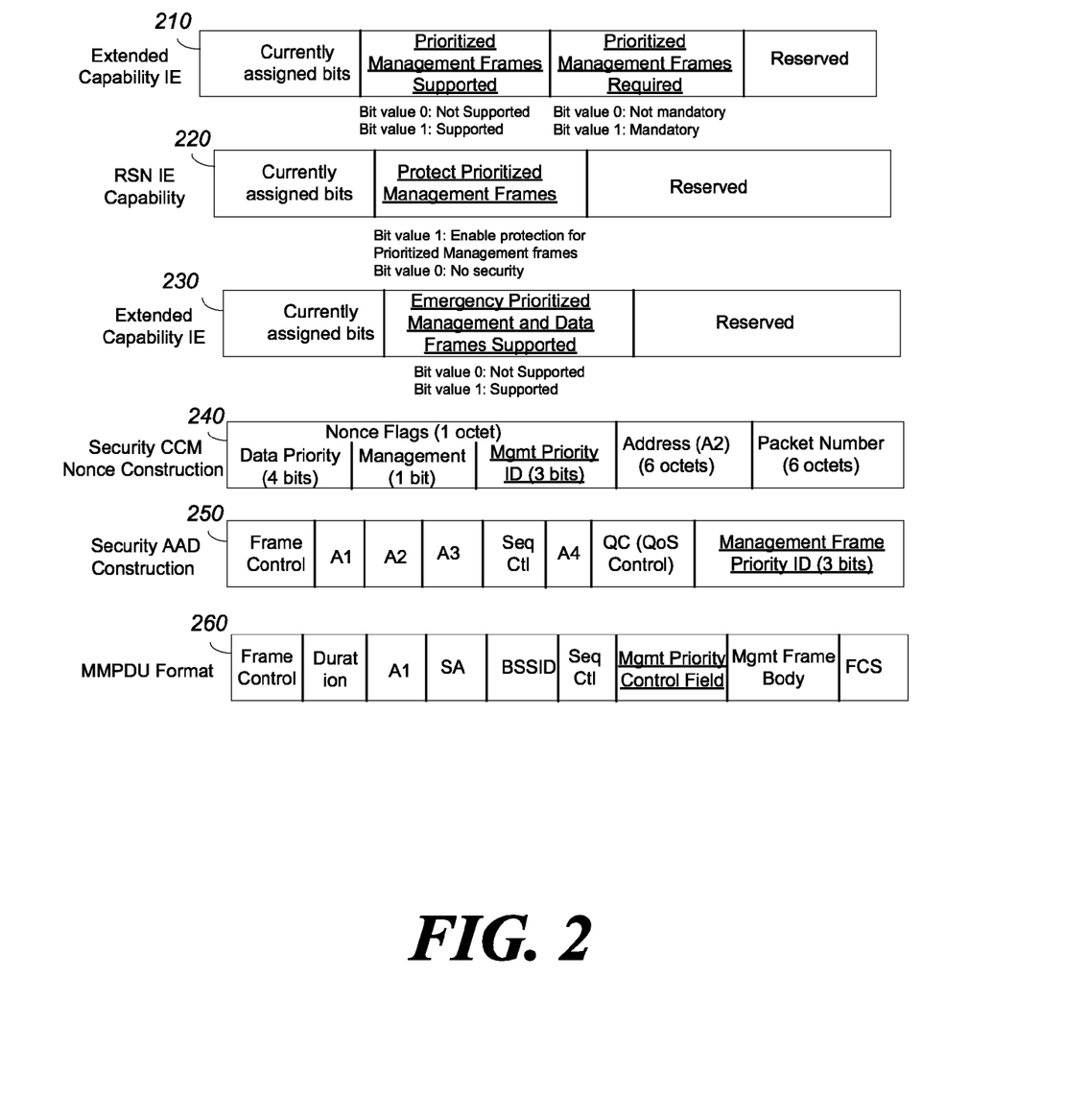
FIG. 2 is an illustration of management frames used with some exemplary embodiments of the invention.

Turning to FIG. 2, an illustration management frames which may used with some exemplary embodiments of the invention is shown (various embodiments may use one or more of the frames shown; other frames may be used). An extended capability information element (IE) 210 may be used by AP 120 to advertise its support of Prioritized Management frames to MS 110 by setting "Prioritized Management Frames Supported" to 1, and set to 0 when prioritized management frames are not supported (other bit or field values may be used, and other indicators may be used, for this and other indications). For example, AP 120 may set the "Prioritized Management Frames Required" bit to 1 when it associates with the MS (e.g., MS 110) that supports prioritized management frames. AP 120 may set the "Emergency Prioritized Management and Data Frames Supported" bit to indicate support for providing prioritization of frames carrying emergency services. Likewise, the MS may use these fields to indicate its support of the same capabilities.

A Robust Security Network Association (RSN) capability IE 220 may be used for indicating support for protecting prioritized management frames, and for negotiating protection schemes (e.g. security algorithm) for prioritized management frames.

An extended capability information element (IE) 230 may be used for indicating support for, and negotiating use of, prioritized management frames.

A security (Counter with Cipher Block Chaining Message Authentication Code (CBC-MAC)) CCM Nonce construction 240 is a cryptographic algorithm produced construction or message that may be used for providing randomly unique inputs for security processing of prioritized management frames.

A security Additional Authentication Data (AAD) construction 250 may be used for providing authentication and integrity protection to the fields of a prioritized management frame that may not be encrypted. For example, the Prioritized Quality of Service fields may need to be protected, but cannot be encrypted as they belong to the frame header and may be used for frame routing and processing by AP 120 and MS 110, if desired.

A MAC Management protocol data unit (MMPDU) 260 is a smaller fragmented frame of a larger Prioritized Management frames. Large frames may be fragmented for efficient MAC transmission between AP 120 and MS 110, if desired.

In some embodiments of the invention, management frames for a specific traffic class/priority may be sent prior to the data frames of the same traffic class/priority, if desired. For example, a roaming prioritized management frame impacting users' voice quality or a Management Frame containing users' health data needs to be sent as a higher priority than a Network Diagnostics management frame which are large and used for routine data collection. Emergency priority may be advertised in the Capability IE 230 and may apply to both data and management frames, if desired.

The encryption encapsulation of prioritized management frames which use AES-CCMP may use the management priority class as an input into the CCM Nonce construction 240. This is shown with three additional bits in the Mgmt Priority ID field of CCM Nonce Construction 240.

The prioritized management frames priority identifier may be included in the construction of the AAD (Additional Authentication Data). The AAD may be included in the AES-CCMP processing of the management frame wherein, AES is Advanced Encryption Standard and CCMP is a Counter Mode with Cipher Block Chaining Message Authentication Code Protocol. For example, in a receiving station, this AAD may be re-calculated and may be checked in order to confirm the computation of the encryption and integrity of management frame 326, if desired.

In addition, the receiving station may check if a management frame type matches the priority level at which it was negotiated to be delivered. The security of a prioritized management frame may only be applicable if the station has negotiated security (RSN), and keys have been established prior to protecting the prioritized frames.

Figure 3:
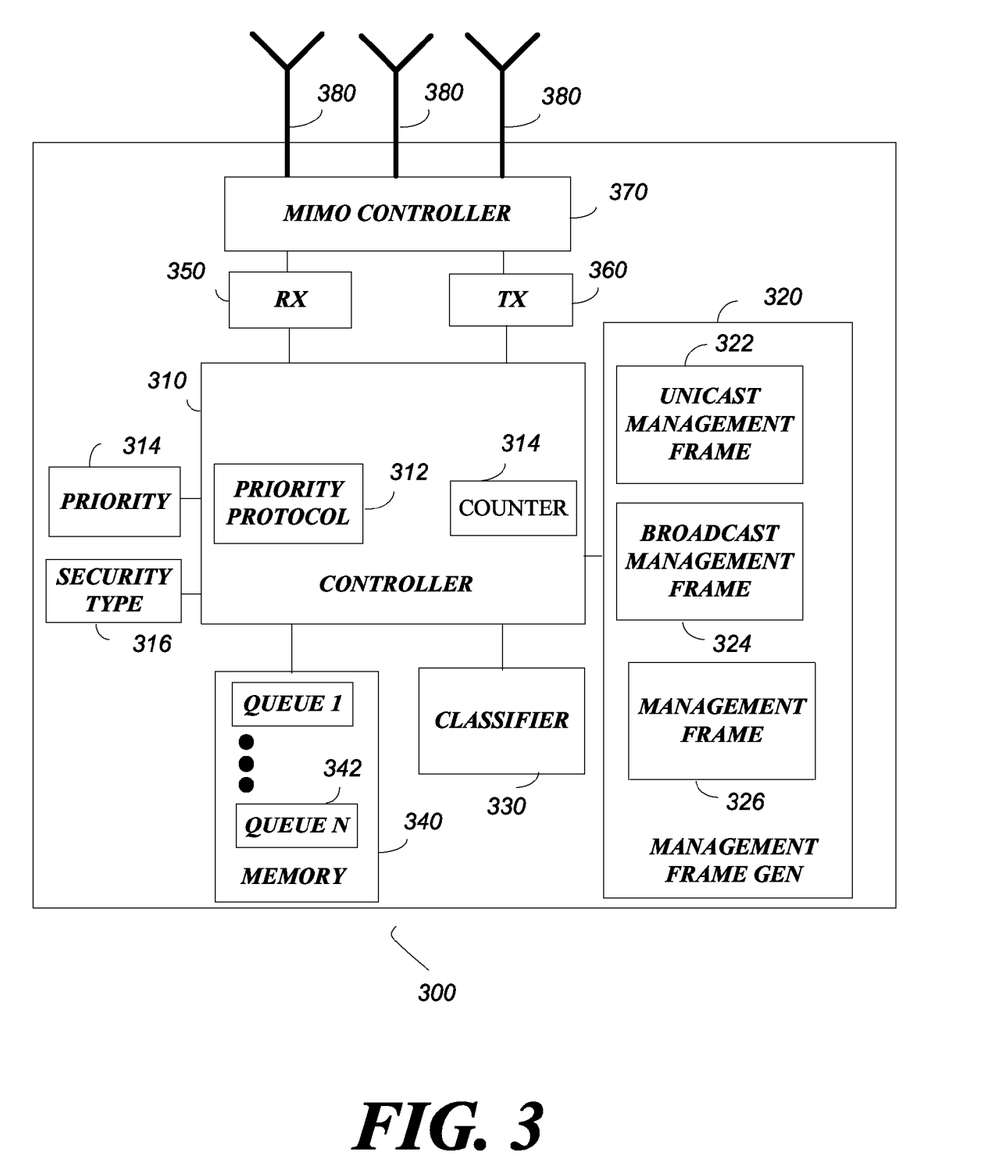
FIG. 3 is an illustration of a wireless communication device according to some embodiments of the invention.

Turning to FIG. 3, an illustration of a wireless communication device 300 according to some embodiments of the invention is shown. Although the scope of the present invention is not limited in this respect, an exemplary embodiment of wireless communication device 300 may include a controller 310, a priority protocol 312, a priority level 314, a security type 316, a management frame generator 320 that may generate for example, a unicast management frame 322, a broadcast management frame 324 and any type of management frame 326, if desired.

Although the scope of the present invention is not limited in this respect, priority protocol 312 may be implemented by software and/or by hardware and/or a combination of software and hardware. Priority level 314 security type 316 for example, may be presented by one or more data bits stored in a memory and/or may implemented by a circuit, if desired Furthermore, this exemplary embodiment of wireless communication device 300 may include a classifier 330, a memory 340 that may include a plurality of queues 342 for example Queue 1 . . . Queue N for each received management, a receiver 350, a transmitter 360 a Multiple-input-Multiple-Output (MIMO) receivers transmitters system controller 370 and plurality on antennas 380, although it should be understood that the present invention is not limited to this exemplary embodiment of wireless communication device.

According to exemplary embodiments of the invention, antennas 380 may include dipole antennas, an antenna array, a yagi antenna, an internal antenna and/or any suitable antenna for a mobile device able to transmit and receive signals over an air link and/or air medium, if desired.

MIMO controller 370 may group receivers and/or transmitters and may map symbols to and/or from antennas 380, if desired. RX 350 may include one or more receivers. For example, RX 350 may include at least a demodulator and a decoder able to decode and/or demodulate Orthogonal Frequency Division Multiplexing (OFDM) and/or OFDM Access (OFDMA) signals. For example, the OFDM/OFDMA signals may include management frames, data frames control frames or the like. According to some embodiments of the invention RX 350 may operate according to the IEEE 802.11-2007 standard and/or IEEE 802.16 standard and/or Long Term Evolution (LTE) cellular standard, although the scope of the invention is not limited in this respect.

TX 360 may include may include one or more transmitters. For example, TX 360 may include at least a modulator and an encoder able to encode and/or modulate OFDM and/or OFDMA signals. For example, the OFDM/OFDMA signals may include management frames, data frames control frames or the like. According to some embodiments of the invention TX 360 may operate according to the IEEE 802.11-2007 standard and/or the IEEE 802.16 standard and/or the LTE cellular standard, although the scope of the invention is not limited in this respect. MIMO controller 370, RX 350 and TX 360 may be implemented by hardware, by software, and/or any combination of hardware or software.

According to some exemplary embodiments of the invention, management frame generator 320 may able to generate a unicast management frame 322, a broadcast management frame 324 and/or a management frame 326, if desired. For example, management frame 326 may include beacon, probe, association and the like.

According to some exemplary embodiments of the invention, controller 310 may include a Medium Access Control (MAC) controller. For example, controller 310 may be designed to process MAC layer signals according to IEEE 802.11-2007 standard and/or IEEE 802.16 standard and/or LTE cellular standard, although the scope of the invention is not limited in this respect.

Controller 310 may include a priority protocol circuit or controller 312. Priority protocol 312 may select priority level 314 and security type 316 and may enable controller 310 to configure a management frame priority and security type. Controller 310 may set a priority level and a transmission data rate of management frame 326, if desired. Memory 340 may be operably coupled to controller 310. Memory 340 may include a plurality of priority queues 342. For example, the number of the priority queues may depend on the number of the management frames, a priority queue for each management frame, if desired. Memory 340 may include an instruction to be executed by controller 310, if desired. Controller 310 may able to negotiate a management frame priority with a destination station and may store the priority in the priority queue 342. For example, controller 310 is able to determine the priority of the management frame relative to a priority of a data frame for an associate traffic class, if desired.

Controller 310 may activate TX 360 to transmit management frame 326, for example according to the priority stored in its priority queue (e.g., Queue 1 . . . Queue N 342).

Furthermore, in some with embodiments of the invention, TX 360 may transmit unicast management frame 322 to a single station of wireless network 100 and broadcast management frame 324 to a plurality of stations of wireless network 100. In this embodiment, controller 310 may provide (e.g., by priority protocol 312) a management frame prioritization protocol to both unicast management frame 322 and broadcast management frame 324, if desired.

For example, priority protocol 312 may use information from received frames for example, Management Priority Control filed of MMPDU 260. Priority protocol 312 may use information in other fields related to priority of the management frame in order to provide priority to the management frame and to control prioritized management frames if desired. For example, fields of extended capability IE 210, RSN capability IE 220, and extended capability IE 230, Security CCM Nonce Construction 240, Security AAD Construction 250 may be used by priority protocol 312 with exemplary embodiments of the invention.

Furthermore, controller 310 may set a top priority to both management frames and data frames related to emergency and/or medical services, if desired.

Classifier 330 may be operably coupled to controller 310. Classifier 330 may determine categories of management frame 326. For example, classifier 330 may determine the categories according to an expected latency parameter and/or a wireless network quality parameter and may classify one or more management frames (e.g., management frame 326) into two or more categories, although the scope of the present invention is not limited in this respect.

According to embodiments of the invention, management frames may be encrypted. Controller 310 may encrypt the management frame 326 based on the priority of said management frame and its priority queue (e.g., queue 342) by using an encryption protocol, for example, the AES-CCMP encryption protocol and/or AES-GCM, wherein AES is Advanced Encryption Standard, CCMP is Counter Mode with Cipher Block Chaining Message Authentication Code Protocol and GSM is Galois Counter Mode. Controller 310 may be able to advertise a security parameter for example, a key, of the management frame to stations and APs of wireless network 100, although the scope of the present invention is not limited in this respect.

Controller 310 may replay protection rules. Controller 310 may include a counter 314 and may monotonically increase a Per-Packet Sequence Number of management frame 326 for protecting against replay attacks. For example, when the wireless communication device operates as a transmit station, controller 310 may keep a same counter (e.g., counter 314) for all data and management frames of all priorities. Controller 310 may apply a counter once to any management frame, and then subsequently increment it, if desired.

In another embodiment of the invention, when the wireless communication device operates as a receiving station, controller 310 may keep a separate counter per each priority bucket for management frames, if desired.

In another exemplary embodiment of the invention, when an encrypted and replay protected prioritized management frame is received, the receiving station may ignore the management frame if a counter in the management frame header is less than or same as its previously received counter in a management frame of same priority, although the scope of the present invention is not limited in this respect.

Figure 4:
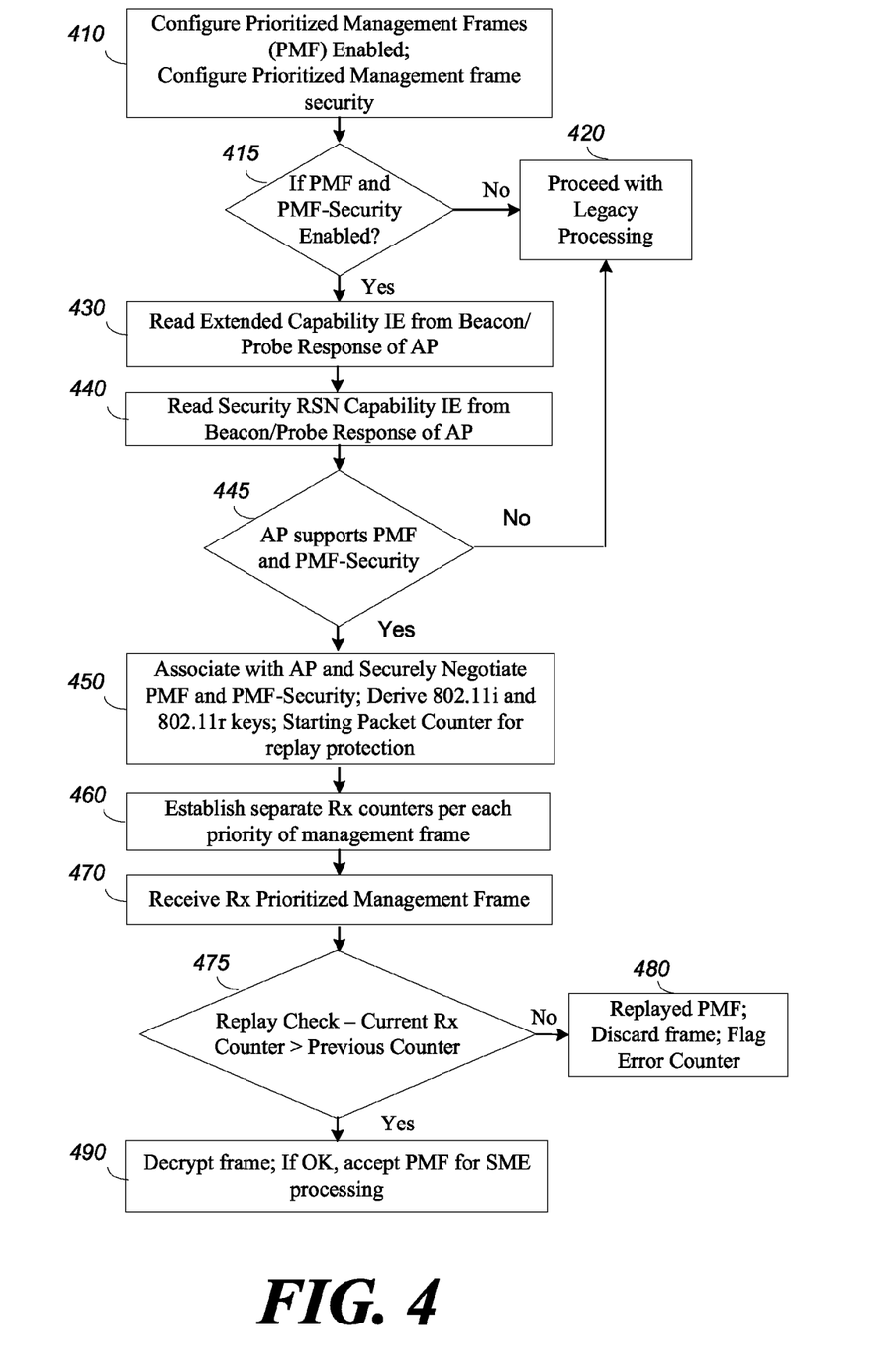
FIG. 4 is a flow chart diagram of a method of prioritizing a management frame, according to some embodiments of the invention.

Turning to FIG. 4, a flow chart diagram of a method of prioritizing a management frame, according to some embodiments of the invention, is shown. According to one exemplary embodiment, a receiving station may receive a not prioritized management frame for example, a beacon and/or a probe response from the AP, if desired. The receiving station may configure prioritized management frames (PMF) as enabled and may configure the prioritized management frames security (text box 410). If the PMF and PMF are security enabled (diamond 415) then controller 310 (or another controller, as other hardware sets may implement embodiments of the invention) may for example, read in Extended capability IE 210 of the beacon the "Prioritized Management Frame Support" field and/or the "Prioritized Management Frame Required" field (text box 430) and may read in RSN Capability IE 220 of the beacon/probe response the "Protected Prioritized Management Frame" field (text box 440). In the case that Prioritized management frame is not supported the receiving station may proceed with legacy IEEE 802.11 processing, if desired (text box 420)

According to this exemplary method, if the AP does not support PMF and PMF-security (diamond 445) the receiving station may proceed with legacy IEEE 802.11 processing, if desired (text box 420). However, if the AP supports PMF and PMF-security (diamond 445) then the receiving station (e.g. MS 110) may associate with the AP (e.g. AP 120) and securely negotiate PMF and PMF security, drive keys for encryption (e.g. according to IEEE 802.11i and IEEE 802.11r) and may start a packet counter for replay protection (text box 450). The receiving station may establish separate counters (e.g., counter 314) for each priority of the management frames (text box 460).

Although the scope of the present invention is not limited to this exemplary method, the receiving station (e.g., MS 110) may receive a PMF for the AP for example, AP 120 (text box 470). For example controller 310 may perform a replay check by comparing the current receiving counter to a previous receiving counter. If the current receiving counter value is greater then the previous receiving counter value (diamond 475) then the receiving station may decrypt the received PMF and accept the PMF for further processing for example short message entity (SME) processing, if desired (text box 490). If the current receiving counter value is greater then the previous receiving counter value (diamond 475) then the receiving station may replay the PMF, discard the PMF and flag an error counter (text box 480), although it should be understood that the scope of the present invention is not limited to this exemplary embodiment of the invention.

Some embodiments of the present invention may support encryption and authentication integrity ciphers to negotiate for data and management protection of a prioritized management traffic. At key establishment time, both the parties (e.g., AP and MS) may establish starting values for replay counters. Encrypted prioritized management frames may not be re-ordered in transmit queues between the same priority level, but may be re-ordered across priority levels. This may allow low-priority level management frames to be held back to give preference to higher-priority management frames without breaking replay protection, if desired.

Advantageously, some embodiments of the present invention provide a method, apparatus and system for prioritizing management frames and using prioritized management frames which minimizes impact to data traffic and user service levels.

Embodiments of the invention may support healthcare applications which require IEEE 802.11 wireless systems to carry "Emergency" traffic at the highest priority.

Furthermore, embodiments of the invention may allow inter-operability with legacy wireless devices and may allow gradual phasing in and co-existence of prioritized, secure prioritized and legacy (un-prioritized) clients.

Embodiment of the invention may be used with wireless systems such as, for example, WiFi networks, WiMAX networks, ad-hoc and peer-to-peer networks, Cellular systems, satellite communication system, wireless personal communication networks and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a controller to apply a management frame prioritization protocol to wireless transmission of at least one wireless communication management frame, said management frame prioritization protocol including a plurality of management frame priority classes, each having a priority level, a transmission data rate and a number of retries, wherein the at least one wireless communication management frame includes at least one frame selected from the group consisting of a probe, an authentication frame, an association frame, and a beacon, said controller to negotiate one or more of said management frame priority classes with a destination station, and to prioritize the wireless communication management frame according to the one or more negotiated management frame priority classes;

a memory operably coupled to said controller, including a plurality of priority queues corresponding to said plurality of management frame priority classes, wherein said controller is to assign said wireless communication management frame to a priority queue of said queues based on a priority class of said management frame; and a wireless transmitter to transmit an information element (IE) including a field having a predefined value indicating that management frame prioritization is supported, and to transmit said wireless communication management frame from said priority queue according to a priority level, transmission data rate and number of retries of a priority class corresponding to said priority queue.

2. The apparatus of claim 1, wherein the controller is to apply said management frame prioritization protocol to both a unicast management frame and a broadcast management frame, and wherein said transmitter is to transmit said unicast management frame to a single station and to transmit the broadcast management frame to a plurality of stations.

3. The apparatus of claim 1, comprising:
a classifier operably coupled to the controller to classify said management frame with respect to said plurality of management frame priority classes.

4. The apparatus of claim 1, wherein the controller is configured to set a top priority to a top priority queue of said plurality of priority queues, and to assign to said top priority queue management frames, which relate to at least one service selected from the group consisting of emergency services and medical services.

5. The apparatus of claim 1, wherein the controller is configured to determine the priority of the management frame relative to a priority of a data frame for an associate traffic class.

6. The apparatus of claim 1, wherein the controller is to encrypt and provide security replay protection for the management frame based on the priority class of said management frame and the queue, to which the management frame is assigned, by using at least one protocol selected from the group consisting of an Advanced Encryption Standard Counter Mode with Cipher Block Chaining Message Authentication Code Protocol (AES-CCMP) encryption protocol and an AES Galois Counter Mode (AES-GCM) encryption protocol.

7. A method comprising:
transmitting an information element (IE) including a field having a predefined value indicating that management frame prioritization is supported;
negotiating one or more management frame priority classes of a plurality of management frame priority classes with a destination station;
prioritizing a wireless communication management frame according to the one or more negotiated management frame priority classes, wherein the wireless communication management frame includes a frame selected from the group consisting of a probe, an authentication frame, an association frame, and a beacon;
assigning the wireless communication management frame to a queue of a plurality of priority queues corresponding to said plurality of management frame priority classes, each of said plurality of queues having a priority level, a transmission data rate, and a number of retries; and
wirelessly transmitting said wireless communication management frame from said queue according to a priority level, transmission data rate and number of retries corresponding to said queue.

8. The method of claim 7, wherein said assigning comprises assigning both a unicast management frame and a broadcast management frame,
and wherein said transmitting comprises transmitting said unicast management frame to a single station and transmitting the broadcast management frame to a plurality of stations.

9. The method of claim 7, comprising:
classifying said management frame to a priority class of said plurality of management frame priority classes.

10. The method of claim 7, comprising:
setting a top priority to a top priority queue of said plurality of priority queues, and assigning to said top priority queue management frames, which relate to at least one service selected from the group consisting of emergency services and medical services.

11. The method of claim 7, comprising:
determining the priority of the management frame relative to a priority of a data frame for an associate traffic class.

12. The method of claim 7, comprising:
advertising a security parameter of the management frame.

13. The method of claim 7, comprising:
encrypting and providing replay protection of the management frame based on the priority of said management frame and the queue, to which the management frame is assigned, by using at least one protocol selected from the group consisting of an Advanced Encryption Standard Counter Mode with Cipher Block Chaining Message Authentication Code Protocol (AES-CCMP) encryption protocol and an AES Galois Counter Mode (AES-GCM) encryption protocol.

14. A wireless communication system comprising:
a mobile station including at least:
one or more antennas;
a controller to apply a management frame prioritization protocol to wireless transmission of at least one wireless communication management frame, said management frame prioritization protocol including a plurality of management frame priority classes, each having a priority level, a transmission data rate and a number of retries, wherein the at least one wireless communication management frame includes at least one frame selected from the group consisting of a probe, an authentication frame, an association frame, and a beacon, said controller to negotiate one or more of said management frame priority classes with a destination station, and to prioritize the wireless communication management frame according to the one or more negotiated management frame priority classes;
a memory including a plurality of priority queues corresponding to said plurality of management frame priority classes, wherein said controller is to assign said wireless communication management frame to a priority queue of said queues based on a priority class of said management frame; and
a wireless transmitter to transmit an information element (IE) including a field having a predefined value indicating that management frame prioritization is supported, and to transmit said wireless communication management frame from said priority queue according to a priority level, transmission data rate and number of retries of a priority class corresponding to said priority queue.

15. The wireless communication system of claim 14, wherein the controller is able to apply said management frame prioritization protocol to both a unicast management frame and a broadcast management frame, and wherein said transmitter is to transmit said unicast management frame to a single station and to transmit the broadcast management frame to a plurality of stations.

16. The wireless communication system of claim 14, wherein the mobile station comprises:
a classifier operably coupled to the controller to classify said management frame into a priority class of said plurality of management frame priority classes.

17. The wireless communication system of claim 14, wherein the controller is configured to assign to a top priority queue management frames, which relate to at least one service selected from the group consisting of emergency services and medical services.

18. The wireless communication system of claim 14, wherein the controller is configured to determine the priority of the management frame relative to a priority of a data frame for an associate traffic class.

19. The wireless communication system of claim 14, wherein the controller is to encrypt and provide security replay protection for the management frame based on the priority class of said management frame and the queue, to which the management frame is assigned, by using the Advanced Encryption Standard Counter Mode with Cipher Block Chaining Message Authentication Code Protocol (AES-CCMP) encryption protocol.

20. A device comprising:
a controller; and
a memory, having stored thereon instructions, that when executed by the controller, result in:
transmitting an information element (IE) including a field having a predefined value indicating that management frame prioritization is supported;
configuring a plurality of management frame priority classes, each having a priority level, a transmission data rate and a number of retries;
negotiating one or more of said management frame priority classes with a destination station;
classifying a wireless communication management frame to a priority class of said plurality of priority classes, wherein the wireless communication management frame includes a frame selected from the group consisting of a probe, an authentication frame, an association frame, and a beacon;
prioritizing the wireless communication management frame according to the one or more negotiated management frame priority classes by
assigning said wireless communication management frame to a queue of a plurality of priority queues corresponding to said plurality of management frame priority classes; and
transmitting said wireless communication management frame from said queue according to a priority level, transmission data rate and number of retries of a priority class corresponding to said queue.

21. The device of claim 20, wherein the instructions when executed result in: assigning to a top priority queue management frames, which relate to at least one service selected from the group consisting of emergency services and medical services.

22. The device of claim 20, wherein the instructions when executed result in:
determining the priority of the management frame relative to a priority of a data frame for an associate traffic class.

23. The device of claim 20, wherein the instructions when executed result in:
advertising a security parameter of the management frame.

24. The device of claim 20, wherein the instructions when executed result in:
encrypting and providing replay protection of the management frame based on the priority of said management frame and the queue, to which the management frame is assigned, by using an Advanced Encryption Standard Counter Mode with Cipher Block Chaining Message Authentication Code Protocol (AES-CCMP) encryption protocol.

* * * * *